United States Patent
Buckmiller et al.

(10) Patent No.: US 10,249,078 B1
(45) Date of Patent: Apr. 2, 2019

(54) SYSTEM AND METHOD FOR SIMULATING INFRARED (IR) LIGHT HALOS IN A COMPUTER GRAPHICS DISPLAY

(71) Applicant: Rockwell Collins, Inc., Cedar Rapids, IA (US)

(72) Inventors: David A. Buckmiller, Holladay, UT (US); Layne H. Thorup, Lehi, UT (US); Thomas P. Skowyra, Salt Lake City, UT (US); David Quinn LeBaron, Sandy, UT (US); Randy Harris, Huntsville, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/617,601

(22) Filed: Jun. 8, 2017

(51) Int. Cl.
| | |
|---|---|
| *G06T 15/00* | (2011.01) |
| *G06T 15/50* | (2011.01) |
| *G06T 19/00* | (2011.01) |
| *G09B 9/30* | (2006.01) |
| *G09B 9/36* | (2006.01) |
| *G09B 9/32* | (2006.01) |

(52) U.S. Cl.
CPC .......... *G06T 15/506* (2013.01); *G06T 19/006* (2013.01); *G09B 9/302* (2013.01); *G09B 9/32* (2013.01); *G09B 9/36* (2013.01)

(58) Field of Classification Search
CPC .......... G02B 21/16; G02B 21/26; G02B 23/12
USPC ....................................................... 345/418
See application file for complete search history.

(56) References Cited

U.S. PATENT DOCUMENTS

| | | | |
|---|---|---|---|
| 6,196,845 B1 * | 3/2001 | Streid ...................... | G09B 9/36 345/467 |
| 6,780,015 B2 * | 8/2004 | Swaine .................. | G09B 9/003 345/7 |

(Continued)

OTHER PUBLICATIONS

Zacher JE, Brandwood T, Thomas P, Vinnikov M, Xu G, Jennings S, Macuda T, Palmisano SA, Craig G, Wilcox L, Allison RS. Effects of image intensifier halo on perceived layout. InHead-and Helmet-Mounted Displays XII: Design and Applications May 1, 2007 (vol. 6557, p. 65570U). International Society for Optics and Photonics.*

(Continued)

*Primary Examiner* — Phu K Nguyen
(74) *Attorney, Agent, or Firm* — Angel N. Gerdzhikov; Donna P. Suchy; Daniel M. Barbieri

(57) ABSTRACT

A system and related method for simulating IR halos in a computer graphics display generates a set of halo candidates corresponding to each new scene by scanning the frame buffer for that scene to flag pixels associated with unocculted light sources as halo candidates, or prospective halo centers around which simulated halos are to be drawn. The system adjusts the defocus value of flagged halo candidates based on their pixel distance and determines whether identified halo centers are new, continuing, or expired by comparing the current scene and its halo candidate list to the preceding (currently displayed) image and its list of current halo centers. The system generates a dual visible/IR image, adding IR-only polygonal halos to the identified halo centers based on pixel attributes. The dual image is projected for viewing by night vision goggles, which the IR-only image and component halos will stimulate.

20 Claims, 6 Drawing Sheets

(56) References Cited

U.S. PATENT DOCUMENTS

2006/0175550 A1\* 8/2006 Siddiqi ................ G02B 21/16
250/338.1
2012/0157377 A1\* 6/2012 Shantha ............... A61K 31/409
514/6.5

OTHER PUBLICATIONS

Cui D, Ren L, Chang B, Shi F, Shi J, Qian Y, Wang H, Zhang J. Halo performance on low light level image intensifiers. InPIAGENG 2013: Image Processing and Photonics for Agricultural Engineering Mar. 4, 2013 (vol. 8761, p. 876108). International Society for Optics and Photonics.\*

Thomas PJ, Allison RS, Carr P, Shen E, Jennings S, Macuda T, Craig G, Hornsey R. Physical modeling and characterization of the halo phenomenon in night vision goggles. Inhelmet-and head-mounted displays X: technologies and applications May 19, 2005 (vol. 5800, pp. 21-32). International Society for Optics and Photonics.\*

\* cited by examiner

SYSTEM AND METHOD FOR SIMULATING INFRARED (IR) LIGHT HALOS IN A COMPUTER GRAPHICS DISPLAY

BACKGROUND

Night vision imaging systems (NVIS), such as night vision goggles, allow for image generation under extreme low light conditions. For example, a pilot may use night vision goggles to view a simulated scene (a "stimulated simulation"). Infrared (IR) projectors may generate an IR image corresponding to a conventional visible-light image; the IR image may be visible only through the night vision goggles. However, the IR projectors may not generate sufficient energy to simulate light halos: large, bright circular areas surrounding points of bright light. The NVIS goggles may be externally stimulated; for example, the IR image generator may render light points and halos so as to be visible only in the IR stream, e.g., as polygons approximating a round halo.

However, as these rendered polygonal halos are a screen-space effect, if a light point (around which the halo is to be generated, with the light point as a center) is visible, the complete halo must also be visible. For example, a halo may disappear from the field of view only when the whole halo itself, rather than its associated light point, moves off an edge of the field of view. If a light point is occulted (e.g., obscured, temporarily or permanently, by another object situated between the light point and the observer) the halo must be made to disappear from view. If the image generator simply rendered a halo for every light point, occultation errors may occur where halos persist when their associated light points are occulted. This may not be an issue for runway modeling, where the points of light will not be occulted during simulated landing operations. To accurately render halos for visible points of light under non-runway conditions an occultation test (e.g., line-of-sight) must be performed for every halo candidate point (an expensive process to maintain under real-time conditions).

SUMMARY

In one aspect, embodiments of the inventive concepts disclosed herein are directed to a system for simulating IR halos in a computer graphics display viewable through night-vision goggles (e.g., in a flight simulator system wherein the pilot has access to visible-spectrum out-of-window views as well as the night vision goggles). The system includes an image generator configured to generate halo candidate sets for each new scene by flagging new pixels in the new scene (e.g., by scanning the z-buffer) as halo candidates if the new pixels are associated with an unocculted light source. Each new pixel may be associated with other attributes such as a defocus value and a pixel distance. The image generator may generate, for each new scene, visible-spectrum images as well as IR-only images visible only via the night vision goggles. The IR-only images may include polygonal halos drawn around identified halo candidates (e.g., centers of the polygonal halos) based on the individual pixel attributes (e.g., the pixel distance and halo center location as well as halo radius and intensity). The system includes real-time processors for generating the sequence of scenes (e.g., the preceding scene currently displayed and subsequent new scenes) based, e.g., on modeling data. The real-time processors may adjust the defocus value of identified halo candidates based on the associated pixel distance and designate halo candidates as either new halo centers (e.g., if the pixel was not a halo center in the preceding scene) or existing halo centers (e.g., if the pixel was a halo center in the preceding scene but moved to a new position relative to the new scene). The real-time processors may designate pixels in the new scene as expired halo centers, e.g., if the pixels are associated with unocculted light sources in preceding scenes but not in the new scene (halos associated with expired halo centers may be removed or allowed to fade out). The system includes a dual-source image projector for projecting the visible and IR-only images toward a display surface where both images may be viewed through the night vision goggles.

In a further aspect, embodiments of the inventive concepts disclosed herein are directed to a method for simulating IR halos in a simulated scene viewable through night vision goggles. The method may include generating, via an image generator of a flight simulator system, a halo candidate set for a new scene (of a sequence of scenes) by flagging new pixels of the new scene as halo candidates if the pixels are associated with unocculted light sources. Other pixel attributes in addition to halo candidate status may include a defocus value and pixel distance (e.g., from the viewer). The method may include adjusting, via a real-time processor of the flight simulator, the defocus value of halo candidates based on the associated pixel distance. The method may include designating, via the real time processor, halo candidates as new halo centers or existing halo centers by comparing the set of halo candidates (associated with the new scene) with the current set of halo centers (associated with a prior or preceding scene displayed by the flight simulator). The method may include designating other pixels of the new scene as expired halo centers by comparing the halo candidate set to pixels in the preceding scene. The method may include generating, via the image generator, a visible-spectrum image of the new scene. The method may include generating, via the image generator, an IR-only image of the new scene (the IR-only image including polygonal halos drawn around the identified new and existing halo centers based on, e.g., the halo radius or halo intensity associated with each pixel). The method may include projecting the visible and IR-only images toward a display surface (e.g., for viewing through the night vision goggles) via a dual-input projector of the flight simulator.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
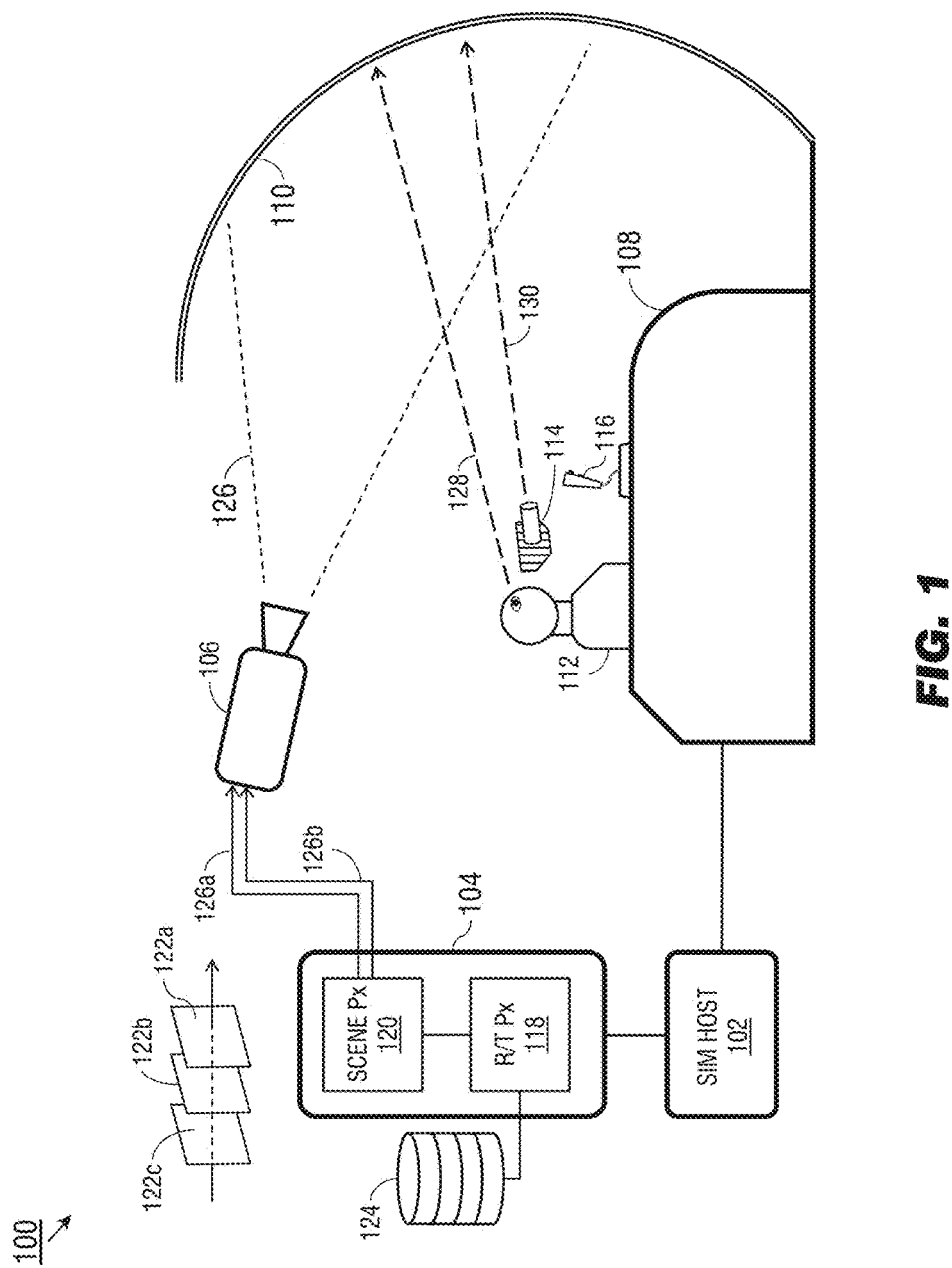
FIG. 1 is a diagrammatic illustration of an exemplary embodiment of a flight simulator system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for simulating IR halos in a computer graphics display visible through night vision goggles. The system may generate stimulated-simulation halos detectable by the night-vision goggles more accurately and more efficiently, as there is no need to perform an occultation test on each individual pixel in the scene.

Referring to FIG. 1, an exemplary embodiment of a flight simulator 100 configured for simulating infrared (IR) halos in computer generated images visible by night vision goggles according to the inventive concepts disclosed herein may include one or more simulation host processors 102, an image generator (104) (e.g., scene processor), an IR-compatible dual-input projector 106, a simulator console 108, and a display surface 110. The flight simulator 100 may be used for training a pilot 112, e.g., for nighttime missions when the pilot may be equipped with night vision goggles 114. For example, the simulation host processors 102 may respond to input from the simulator console controls (116) by performing flight dynamics calculations to adjust the velocity, attitude, or location of a simulated aircraft. Adjustments to the simulated aircraft are communicated by the image generator 104, which may include real-time (RT) processors 118 and scene processors 120. The image generator 104 may generate a sequence of animated scenes (122a-c) based on the flight dynamics adjustments and modeled data stored to hard disks (124) of the image generator. The scene processors 120 may render the sequence of scenes 122a-c as a simulated scene 126 (e.g., a stream of images) projected onto the display surface 110 by the dual-image projector 106 for viewing by the pilot 112. The dual-image projector 106 may receive from the image generator 104, and project onto the display surface 110, a visible-spectrum (RGB) image (126a) as well as an IR-only image (126b). The pilot 112 may view this projected simulated scene (126) through the naked eye (128) to simulate the perspective of an out-the-window (OTW) observer, in which case elements of the visible-spectrum image 126a may be visible to the pilot 112 but the IR-only image 126b may not be. Alternatively, the pilot 112 may choose to view the simulated scene 126 through the night-vision goggles 114 (130), in this latter case viewing both the visible-spectrum image 126a and the IR-only image 126b.

However, the dual-input projector 106 does not produce enough IR light by itself to sufficiently stimulate the night vision goggles 110 to produce realistic halos via the simulated scene 126 (in particular, via the IR-only image 126b). The image generator 104 may compensate for the dual-input projector 106 by rendering polygonal halos centered on sufficiently bright light points (e.g., light sources, halo centers) visible in the IR-only image 126b. The image generator 104 must therefore determine which of the potentially thousands of light points in a given animated scene (122a-c) are both visible in the scene (e.g., not occulted by an obstacle positioned between the light source and the pilot 112) and sufficiently bright to form a halo. Rather than, for example, testing each pixel of a new animated scene (122a-c) for occultation, the image generator 104 may flag in the frame buffer any halo candidates, or pixels associated with a light source, for each new (e.g., most recent) scene (122b, the preceding scene 122a corresponding to the visible spectrum image (126a) and IR-only image (126b) currently projected onto the display surface 110 by the dual-input IR projector 106). The RT processors 118 may compare the resulting halo candidate set (pixels associated with non-occulted light sources) with a prior list of halo centers (e.g., those pixels in the preceding scene 122a around which halos have been added) to determine whether halo candidates are new halo candidates, e.g., light sources portrayed in the new scene 122b that were not portrayed in the preceding scene 122a. Similarly, the RT processors 118 may identify existing halo candidates, or light sources in the new scene 122*b* that correspond to non-occulted light sources (around which halos have been added) in the preceding scene 122*a* (e.g., light points that may have moved, from the perspective of the pilot 112, from the preceding scene 122*a* to the current scene 122*b*. The RT processors 118 may indicate that polygonal halos are to be added (e.g., by a geometry engine of the image generator 104) to the identified new and existing halo candidates, based on individual pixel attributes of each halo candidate, and that the polygonal halos are to be flagged as IR-only. While not included in the projected visible-spectrum image (126*a*), polygonal halos added by the image generator 104 may stimulate the night vision goggles 110 sufficiently to be perceived by the pilot 112 through the night vision goggles as part of the projected IR image (126*a*).

In addition to a halo candidate status, the halo candidate list generated by the image generator 104 by scanning the frame buffer may maintain pixel attributes, or pixel components, for each pixel portrayed in each scene of the scene sequence 122*a-c*. Each pixel may be associated with pixel attributes including, but not limited to, an x-coordinate and a y-coordinate denoting its position in a scene (122*a-c*), RGB (red/green/blue) components or values (e.g., carrying color information for color displays), a halo radius and halo intensity (e.g., non-null values for those pixels designated as halo candidates), a defocus value, and an IR component. For example, an existing halo center may be identified if the change in location of an identified light source (as indicated by its x and y coordinates) matches the movement of the pilot 112 (e.g., the movement of the simulated aircraft, from the pilot's perspective). The defocus value may be used by the image generator 104 for per-primitive blur in generating the RGB visible-spectrum video and visible-spectrum projected image 126*a*, and the IR component may be used as described above to flag the polygonal halo associated with a halo-candidate pixel as IR-only. Pixel attributes may further include a pixel distance representative of the depth of the pixel within a displayed image corresponding to a scene (122*a-c*). The halo radius and halo intensity may be dependent on the pixel distance, e.g., closer pixels may be associated with larger and brighter halos.

Figure 2:
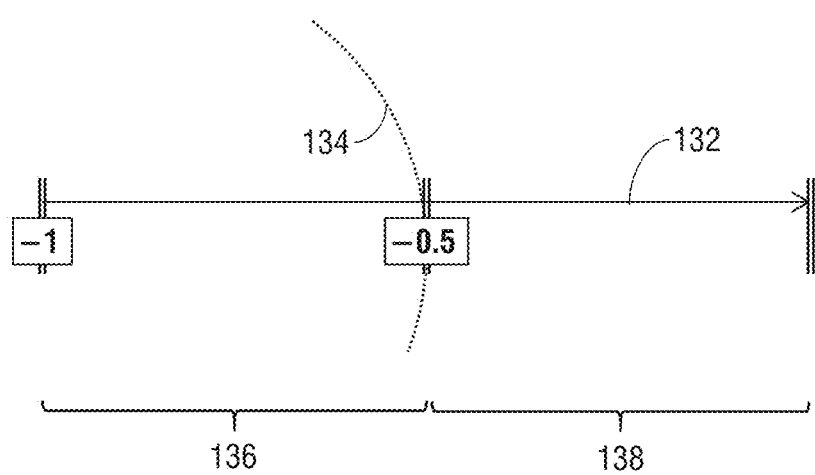
FIG. 2 is a diagrammatic illustration of operations of the system of FIG. 1.

Referring now to FIG. 2, the RT processors (118, FIG. 1) may adjust the defocus value components of pixels flagged as halo candidates based on their pixel distance (132). For example, during primitive effects processing by the image generator (104, FIG. 1), a pixel incoming from the frame buffer may be assigned a "negative" defocus value indicating that the pixel is associated with a light source. The RT processors 118 may predetermine a maximum range (134) for halo consideration, such that any halo candidates within the maximum range 134 (based on the associated pixel distance) may be assigned a "negative" defocus value, e.g., a defocus value in the range (136) from −1 to −0.5. Any halo candidate beyond the maximum range (138) may be assigned a constant value of −0.5, enabling the halo candidate to survive inter-pixel anti-alias filtering for small light sources (light points). The RT processors 118 may assign all primitives not flagged as halo candidates a "positive" defocus value (e.g., a defocus value in the range from 0 to 1), indicating that such primitives will be subject to normal defocus processing.

Figure 3:
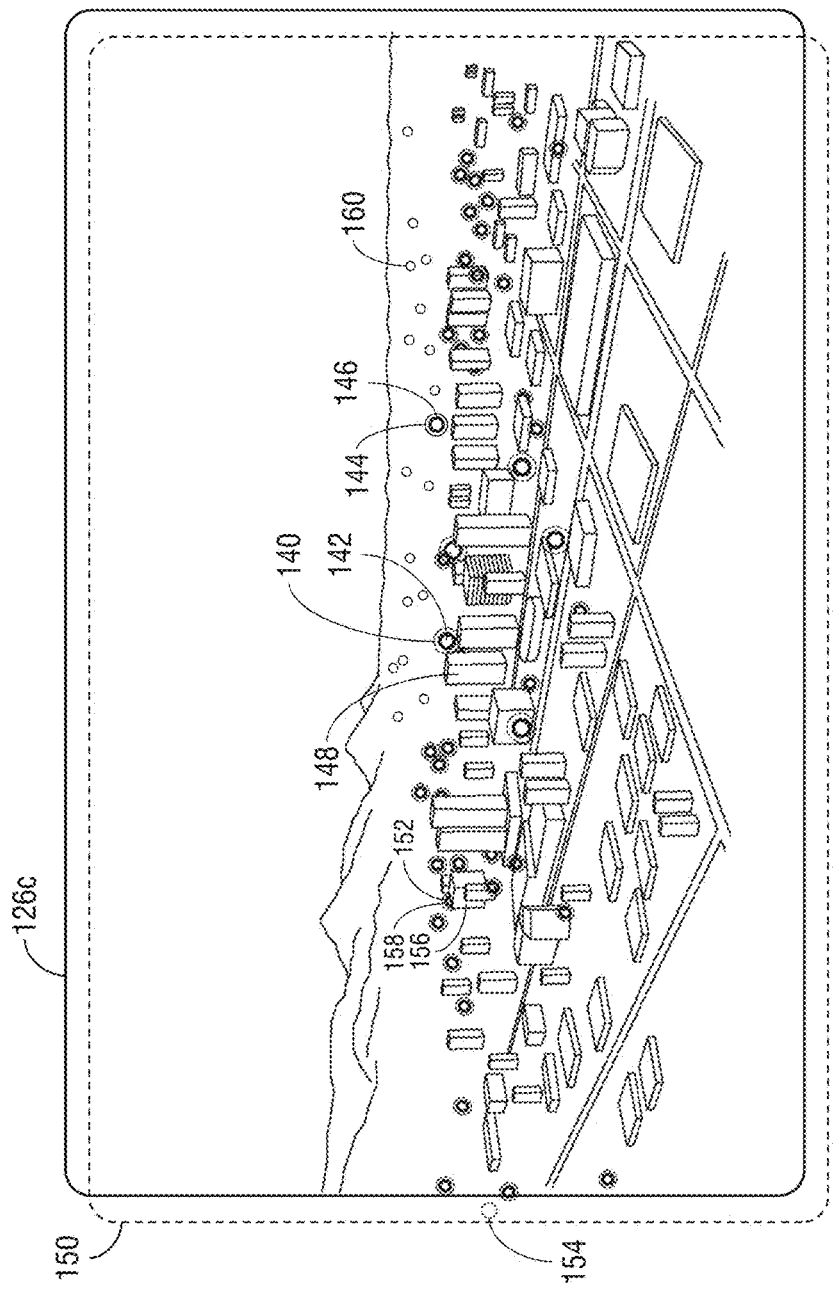
FIG. 3 illustrates simulated scenes generated by the system of FIG. 1.

Referring now to FIG. 3, a simulated scene 126*c* generated by the image generator 104 (FIG. 1) may be implemented and may function similarly to the simulated scene 126 shown by FIG. 1, except that the simulated scene 126*c* may be a current image displayed on the display surface (110, FIG. 1), corresponding to the new scene (122*b*, FIG. 1) and incorporating a visible-spectrum image (126*a*, FIG. 1) and an IR-only image (126*b*, FIG. 1). The simulated scene 126*c* may incorporate IR-only polygonal halos added by the image generator 104 to halo candidates within the maximum range (134, FIG. 2). For example, a polygonal halo 140 may be drawn around any new halo centers (142), and a polygonal halo 144 drawn around any existing halo centers (146), identified by the RT processors (118, FIG. 1) within the maximum range 134, depending on the halo radius and halo intensity associated with each halo center 142, 146. The new halo center 134 may have emerged from behind an obstacle (148, which may in the preceding image (142; corresponding to the preceding scene (122*a*, FIG. 1)) have occulted the new halo center 142) closer to the foreground of the simulated scene 126*c* than the existing halo center (146) in the relative background. Accordingly, the new halo center 142 may be associated with a larger and brighter polygonal halo (140) than the polygonal halo (144) associated with the existing halo center (146). The polygonal halo 144 associated with the existing halo center (146) may be adjusted by the RT processors 118 as the existing halo center 146 changes position from the preceding image (150) to the current simulated scene 126*c*.

The image generator 104 may further identify within the simulated scene 126*c* fadeout halo centers (152) and completed halo centers (154) by comparing the current simulated scene 126*c* corresponding to the new scene (122*b*) with the preceding simulated scene 150 (the preceding image corresponding to the preceding scene (122*a*)), e.g., by comparing the halo candidate list associated with the new scene 122*b* to the halo center list associated with the preceding scene 122*a*. For example, a fadeout halo center 152 may be an existing halo center in the preceding simulated scene 150 that has become occulted (e.g., by an obstacle 156) in the current simulated scene 126*c*. Rather than instantly removing the polygonal halo (158) associated with the fadeout halo center 152, which may distract or disorient the pilot (112, FIG. 1), the image generator 104 may put the fadeout halo center 152 on a countdown timer, allowing the associated polygonal halo 158 to fade out over a predetermined number of successive scenes until the countdown timer expires. For example, with each successive scene after the fadeout halo center 152 is first occulted (assuming the fadeout halo center 152 does not re-emerge from occultation during this interval), the halo intensity and halo radius of the associated polygonal halo 158 may be stepped down until the countdown timer expires and the associated polygonal halo 158 has faded from view. Identified halo candidates corresponding to light sources beyond the maximum range (134, FIG. 2) may appear as light points without an associated halo (160).

Figure 4:
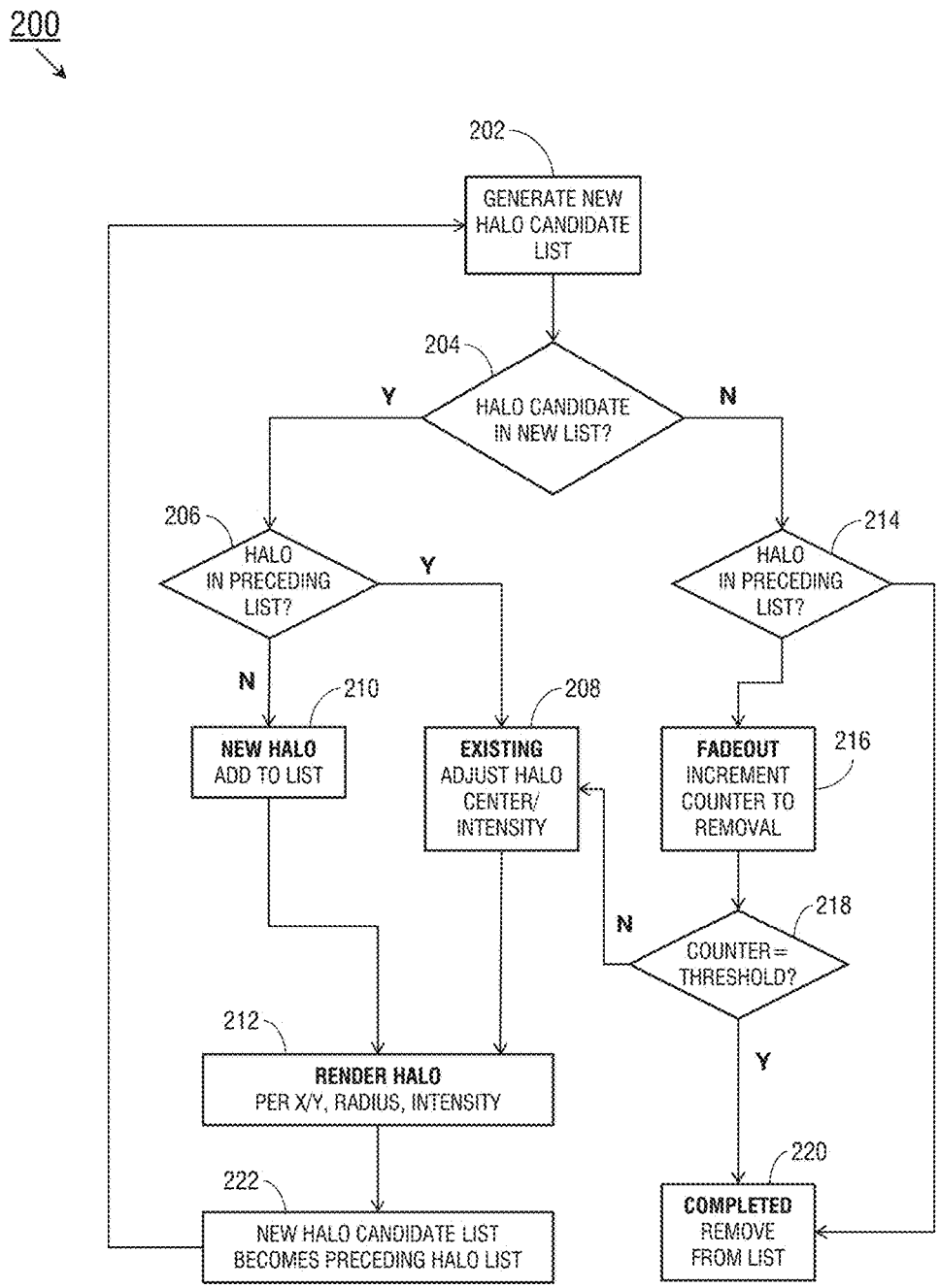
FIG. 4 is a process flow diagram illustrating operations of the system of FIG. 1.

Referring now to FIG. 4, the process flow diagram 200 illustrates halo candidate processing operations of the system 100 (FIG. 1). For example, the image generator (104, FIG. 1) may generate a new/current halo candidate list (202) associated with a new scene (122*b*, FIG. 1) generated by the RT processors (118, FIG. 1), identifying halo candidates in the halo candidate list (204) based on pixels in the new scene 122*b* associated with unocculted light points or sources. For each identified halo candidate, the RT processors 118 may compare the new halo candidate list to a preceding halo list corresponding to the preceding scene (122*a*, FIG. 1) to determine (206) if the halo-candidate pixel was a halo center in the preceding simulated scene (150, FIG. 3). If the halo candidate pixel was a halo center in the preceding simulated scene 150, the RT processors 118 designate (208) the halo candidate pixel as an existing halo center (144, FIG. 3) and adjust the halo radius and intensity of the associated polygonal halo (146, FIG. 3) depending on the pixel attributes of the existing halo center 144. If the halo candidate pixel was not a halo center in the preceding simulated scene 150, the RT processors 118 designate (210) the halo candidate pixel as a new halo center (140, FIG. 3) and add the new halo center to the current halo list, adjusting the halo radius and intensity of the associated polygonal halo (142, FIG. 3) depending on the pixel attributes of the new halo center 132. The image generator 104 then renders (212) the polygonal halos 142, 146 depending on the adjusted pixel attributes.

If a pixel from the new scene 122*b* is not a halo candidate (e.g., is not associated with an unocculted light point) but is determined (214) by the RT processors 118 to have been a halo center in the preceding simulated scene 150, the RT processors 118 designate the pixel as a fadeout halo center (152, FIG. 3) if the pixel has become occulted in the new scene (122*b*), starting a countdown timer (216) for fading out the associated polygonal halo (158, FIG. 3) within a predetermined number of succeeding scenes. When the countdown timer expires, e.g., reaches a predetermined threshold (218), or the RT processors 118 determine the associated fadeout halo center (152) is no longer within the field of view of the new scene (122*b*), the RT processors may designate the pixel (220) as a completed halo center, and remove the pixel from the current halo list. When the current simulated scene 126*c* corresponding to the new scene 122*b* has been rendered and displayed, and IR-only polygonal halos 142, 146 added, the RT processors 118 may designate (222) the new scene (122*b*) as the preceding scene (122*a*) and the halo candidate list associated with the new scene as the current halo list, and proceed to processing of the next succeeding scene (122*c*, FIG. 1).

Figure 5A:
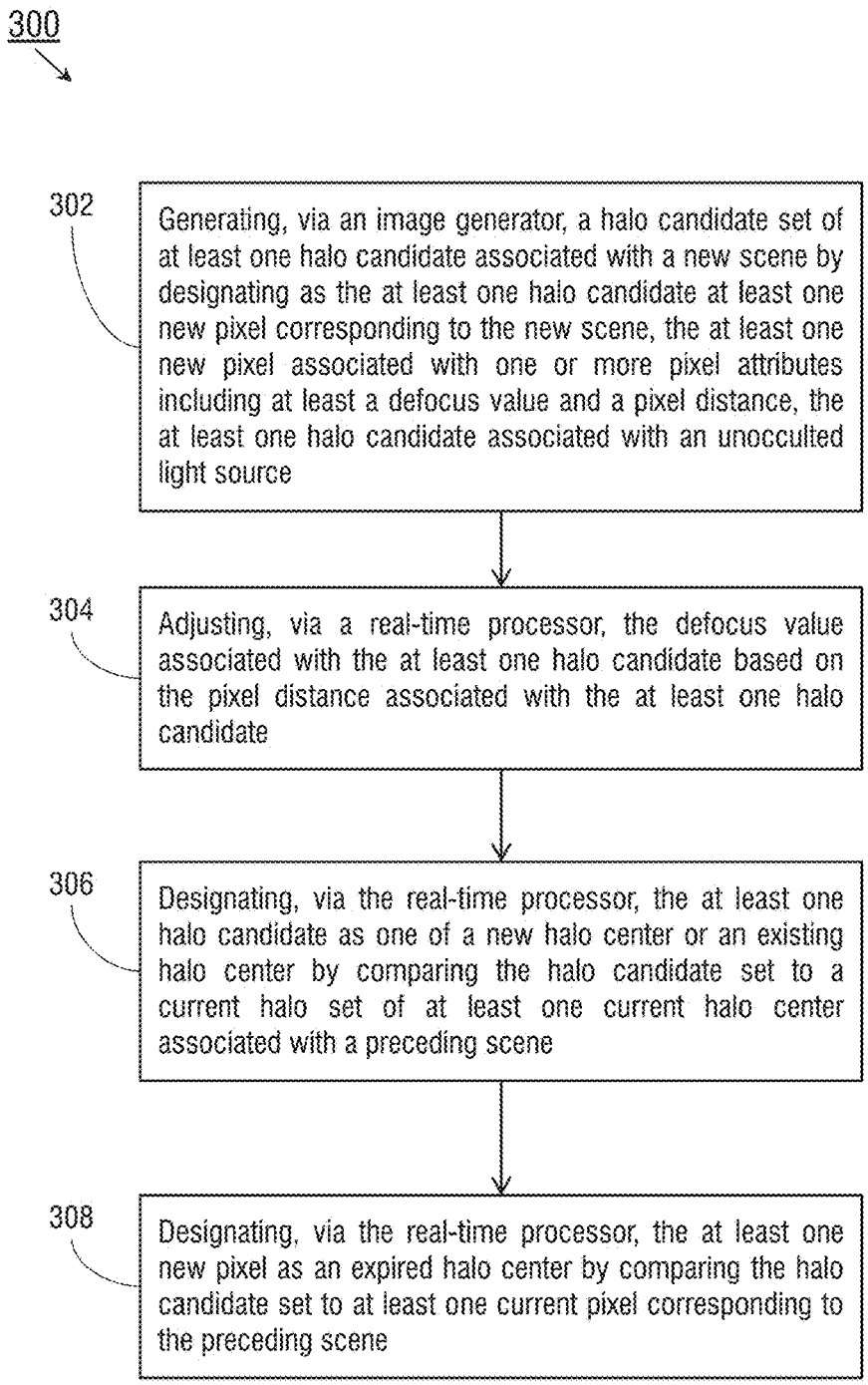
FIGS. 5A and 5B are process flow diagrams illustrating an exemplary embodiment of a method according to the inventive concepts disclosed herein.
Figure 5B:
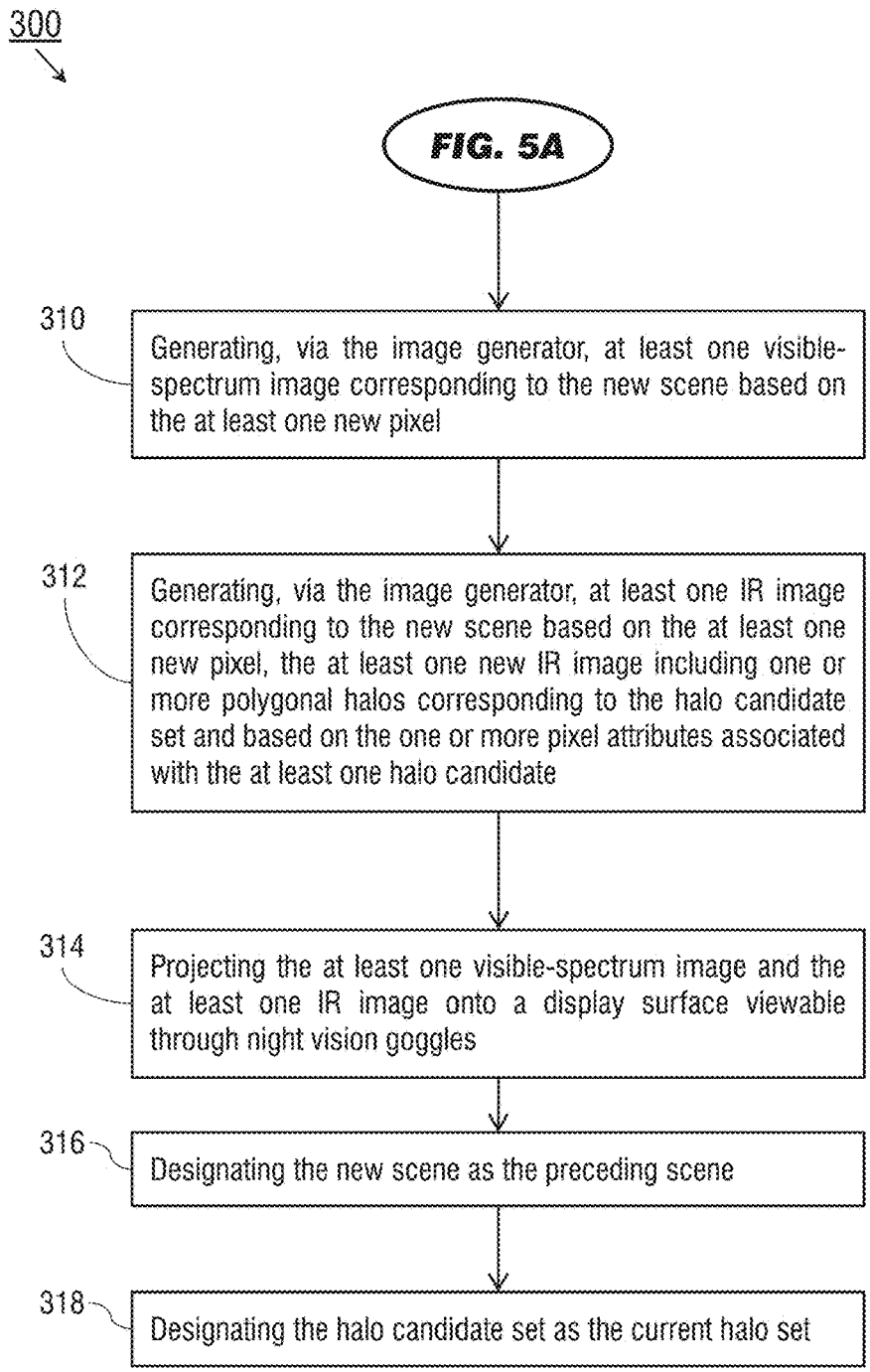

Referring now to FIGS. 5A and 5B, an exemplary embodiment of a method 300 according to the inventive concepts disclosed herein may be implemented by the system 100 (FIG. 1) and may include one or more of the following steps.

Referring particularly to FIG. 5A, at a step 302 an image generator (e.g., of a flight simulator system) generates a halo candidate set associated with a new scene (e.g., displayable by the flight simulator system) by designating as halo candidates pixels of the new scene associated with unocculted light sources or light points. Each pixel may be associated with a set of pixel attributes such as a defocus value and a pixel distance. Pixel attributes may additionally include an x-coordinate and y-coordinate locating the pixel in the scene, a halo radius, and a halo intensity.

At a step 304, a real-time (RT) processor of the system adjusts the defocus value of halo candidates based on their associated pixel distance. For example, halo candidates within the maximum range for halo consideration (based on their pixel distance) may be assigned a halo defocus value, or a defocus value capable of flagging the halo candidate as a halo center, while halo candidates outside the maximum range may be assigned a normal defocus value, indicating a halo may not be added to that pixel.

At a step 306, the RT processor designates halo-candidate pixels associated with the new scene as new halo centers or existing halo centers by comparing the halo candidate set to a current halo set, where the current halo centers are associated with the preceding scene (and corresponding image). For example, the RT processor may identify new halo centers and existing halo centers by comparing the x- and y-coordinates of halo candidates in the new scene to the x- and y-coordinates of halo centers in the preceding scene (new halo centers may be associated with a light source in the new scene but not in the preceding scene, while existing halo centers may be associated with a light source that changes position from the preceding scene to the new scene).

At a step 308, the RT processor designates pixels associated with the new scene as expired halo centers by comparing the halo candidate set to the pixels of the preceding scene. For example, a halo candidate associated with a light source in the preceding scene but not in the new scene may be designated a fadeout halo center or a completed halo center. The RT processor may initiate a countdown timer for fadeout halo centers, adjusting the pixel attributes to fade the associated polygonal halo from view (and adding the adjusted IR-only polygonal halo to the fadeout halo center) until the timer expires, when the fadeout halo center becomes a completed halo center and is removed from the current halo set by the RT processor.

Referring now to FIG. 5B, at a step 310, the image generator generates a visible-spectrum image based on the new scene, according to the halo candidate set corresponding to the new scene.

At a step 312, the image generator generates an IR-only image based on the new scene according to the halo candidate set corresponding to the new scene, the IR image including IR-only polygonal halos corresponding to the halo candidates and based on the pixel attributes of each halo candidate. For example, the image generator may add IR-only polygonal halos to each new halo center and existing halo center, based on the pixel attributes (e.g., halo radius, halo intensity) of each halo center. The image generator may add IR-only polygonal halos to halo candidates assigned a halo defocus value (e.g., halo candidates within the maximum range).

At a step 314, a dual-input projector projects both the visible-spectrum image and the IR-only image toward a display surface viewable through night-vision goggles (e.g., a display surface of the flight simulator).

The method 300 may additionally include the steps 316 and 318. At the step 316, the RT processor designates the new scene as the preceding scene.

At the step 318, the RT processor designates the halo candidate set corresponding to the new scene as the current halo set.

As will be appreciated from the above, systems and methods according to embodiments of the inventive concepts disclosed herein may significantly improve system accuracy and performance by using the frame buffer to determine halo placement, eliminating the need to perform pixel-by-pixel occultation tests to determine whether halos should be added to a scene.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for simulating infrared (IR) halos in a computer graphics display, comprising:
    at least one image generator configured to:
    generate at least one simulated IR halo candidate set associated with a new scene of a sequence of one or more simulated IR scenes by designating at least one new pixel of the new scene as a simulated IR halo candidate of the simulated IR halo candidate set, the at least one simulated IR halo candidate associated with an unocculted simulated light source, the at least one new pixel associated with one or more pixel attributes including at least a defocus value and a pixel distance;
    generate at least one simulated visible-spectrum image corresponding to the new scene based on the at least one new pixel; and
    generate at least one simulated IR image corresponding to the new scene based on the at least one new pixel, the at least one simulated IR image including one or more polygonal halos corresponding to the at least one simulated IR halo candidate and based on the one or more pixel attributes;
    at least one real-time processor coupled to the image generator, the real-time processor configured to:
    generate the sequence of one or more simulated IR scenes including at least one preceding scene;
    adjust the defocus value associated with the at least one simulated IR halo candidate based on the pixel distance associated with the at least one simulated IR halo candidate;
    designate the at least one simulated IR halo candidate as one of a new halo center or an existing halo center by comparing the simulated IR halo candidate set to a current halo set of at least one current halo center associated with the preceding scene; and
    designate the at least one new pixel as an expired halo center by comparing the simulated IR halo candidate set to at least one current pixel corresponding to the preceding scene; and
    at least one image projector coupled to the image generator and configured to project the at least one simulated visible-spectrum image and the at least one simulated IR image onto at least one display surface viewable through night vision goggles.

2. The system for simulating IR halos of claim 1, wherein the image generator is configured to generate the one or more polygonal halos corresponding to the at least one new halo center and the at least one existing halo center.

3. The system for simulating IR halos of claim 1, wherein the real-time processor is configured to:
    designate the new scene as the preceding scene; and
    designate the simulated IR halo candidate set as the current halo set.

4. The system for simulating IR halos of claim 1, wherein the one or more pixel attributes include at least one of include at least one of an x-coordinate, a y-coordinate, a halo radius, and a halo intensity.

5. The system for simulating IR halos of claim 1, wherein the image generator is configured to designate the at least one simulated IR halo candidate as an existing halo center associated with the current halo center corresponding to the unocculted light source associated with the at least one simulated IR halo candidate based on:
    a first x-coordinate and a first y-coordinate associated with the at least one simulated IR halo candidate; and
    a second x-coordinate and a second y-coordinate associated with the current halo center.

6. The system for simulating IR halos of claim 1, wherein:
    the real-time processor is configured to set the defocus value associated with the at least one simulated IR halo candidate to a) a halo defocus value if the associated pixel distance is within a predetermined halo range and b) a normal defocus value if the associated pixel distance is beyond the predetermined halo range; and
    the image generator is configured to generate the one or more polygonal halos corresponding to the at least one simulated IR halo candidate associated with the halo defocus value.

7. The system for simulating IR halos of claim 1, wherein the image generator is configured to designate the at least one new pixel as one of a fadeout halo center or a completed halo center if the at least one new pixel is not associated with an unocculted light source and the current pixel corresponding to the at least one new pixel is associated with an unocculted light source.

8. The system for simulating IR halos of claim 7, wherein the at least one real-time processor is configured to:
    adjust the one or more pixel attributes of the at least one fadeout halo center; and
    add the at least one fadeout halo center to the simulated IR halo candidate set.

9. The system for simulating IR halos of claim 7, wherein the at least one real-time processor is configured to:
    increment a counter associated with the at least one fadeout halo center; and
    when the counter reaches a threshold, designate the associated fadeout halo center as a completed halo center.

10. The system for simulating IR halos of claim 7, wherein the image generator is configured to generate the one or more polygonal halos corresponding to the at least one fadeout halo center.

11. The system for simulating IR halos of claim 1, wherein the system is embodied in a flight simulator system further comprising:
    the at least one display surface;
    at least one control console configured to receive user input from a user of the flight simulator system;
    at least one host processor coupled to the at least one real-time processor, the at least one host processor configured to a) retrieve modeling data from at least one hard disk coupled to the host processor based on the received user input and b) provide the retrieved modeling data to the at least one real-time processor; and
    the at least one real-time processor is configured to generate the sequence of one or more simulated IR scenes based on the retrieved modeling data.

12. A method for simulating infrared (IR) halos in a computer graphic display, the method comprising:
    generating, via an image generator, a simulated IR halo candidate set of at least one simulated IR halo candidate associated with a new scene by designating as the at least one simulated IR halo candidate at least one new pixel corresponding to the new scene, the at least one new pixel associated with one or more pixel attributes including at least a defocus value and a pixel distance, the at least one simulated IR halo candidate associated with an unocculted light source;

adjusting, via a real-time processor, the defocus value associated with the at least one simulated IR halo candidate based on the pixel distance associated with the at least one simulated IR halo candidate;

designating, via the real-time processor, the at least one simulated IR halo candidate as one of a new halo center or an existing halo center by comparing the simulated IR halo candidate set to a current simulated IR halo set of at least one current halo center associated with a preceding scene;

designating, via the real-time processor, the at least one new pixel as an expired halo center by comparing the simulated IR halo candidate set to at least one current pixel corresponding to the preceding scene;

generating, via the image generator, at least one visible-spectrum image corresponding to the new scene based on the at least one new pixel;

generating, via the image generator, at least one simulated IR image corresponding to the new scene based on the at least one new pixel, the at least one new simulated IR image including one or more polygonal halos corresponding to the simulated IR halo candidate set and based on the one or more pixel attributes associated with the at least one simulated IR halo candidate;

and projecting the at least one simulated visible-spectrum image and the at least one simulated IR image onto at least one display surface viewable through night vision goggles.

13. The method of claim 12, wherein generating, via the image generator, at least one IR image corresponding to the new scene based on the at least one new pixel, the at least one new IR image including one or more polygonal halos corresponding to the simulated IR halo candidate set and based on the one or more pixel attributes associated with the at least one simulated IR halo candidate includes:

generating one or more polygonal halos corresponding to the at least one new halo center;

and generating one or more polygonal halos corresponding to the at least one existing halo center.

14. The method of claim 12, further comprising:
designating the new scene as the preceding scene;
and
designating the simulated IR halo candidate set as the current halo set.

15. The method of claim 12, wherein the one or more pixel attributes include at least one of an x-coordinate, a y-coordinate, a halo radius, and a halo intensity.

16. The method of claim 12, wherein adjusting, via a real-time processor, the defocus value associated with the at least one simulated IR halo candidate based on the pixel distance associated with the at least one simulated IR halo candidate includes:

setting the defocus value associated with the at least one simulated IR halo candidate to a halo defocus value if the pixel distance associated with the at least one simulated IR halo candidate is within a predetermined halo range;

and setting the defocus value associated with the at least one simulated IR halo candidate to a normal defocus value if the pixel distance associated with the at least one simulated IR halo candidate is beyond the predetermined halo range.

17. The method of claim 16, wherein generating, via the image generator, at least one IR image corresponding to the new scene based on the at least one new pixel, the at least one new IR image including one or more polygonal halos corresponding to the simulated IR halo candidate set and based on the one or more pixel attributes associated with the at least one simulated IR halo candidate includes:

generating, via the image generator, the one or more polygonal halos corresponding to the at least one simulated IR halo candidate associated with the halo defocus value.

18. The method of claim 12, wherein designating, via the real-time processor, the at least one new pixel as an expired halo center by comparing the simulated IR halo candidate set to at least one current pixel corresponding to the preceding scene includes:

designating the at least one new pixel as one of a fadeout halo center or a completed halo center if the at least one current pixel is associated with an unocculted light source and the at least one new pixel is not associated with an unocculted light source;

adjusting the one or more pixel attributes of the at least one fadeout halo center;

and adding the at least one fadeout halo center to the first set of one or more simulated IR halo candidates.

19. The method of claim 18, wherein adjusting the one or more pixel attributes of the at least one fadeout halo center includes:

incrementing a counter associated with the at least one fadeout halo center;

and when the counter reaches a threshold, designating the associated fadeout halo center as a completed halo center.

20. The method of claim 18, wherein generating, via the image generator, at least one IR image corresponding to the new scene based on the at least one new pixel, the at least one new IR image including one or more polygonal halos corresponding to the simulated IR halo candidate set and based on the one or more pixel attributes associated with the at least one simulated IR halo candidate includes:

generating at least one polygonal halo corresponding to the at least one fadeout halo center.

* * * * *